United States Patent [19]

Killmann et al.

[11]  4,294,546
[45]  Oct. 13, 1981

[54] APPARATUS FOR WORKING ALIGNED BORES

[75] Inventors: Irolt Killmann, St. Augustin-Mülldorf; Georg W. Bonifer, Cologne, both of Fed. Rep. of Germany

[73] Assignee: Klöckner-Humboldt-Deutz Aktiengesellschaft, Cologne, Fed. Rep. of Germany

[21] Appl. No.: 26,076

[22] Filed: Apr. 2, 1979

[30] Foreign Application Priority Data

Dec. 29, 1977 [DE] Fed. Rep. of Germany ....... 2758742

[51] Int. Cl.³ .............................................. G01B 11/26
[52] U.S. Cl. .................................... 356/399; 356/400; 350/286
[58] Field of Search ............... 356/153, 154, 399, 400, 356/401; 350/286; 250/229, 231 R

[56] References Cited

U.S. PATENT DOCUMENTS

| | | | |
|---|---|---|---|
| 2,378,526 | 6/1945 | Agnew | 250/231 R |
| 3,551,057 | 12/1970 | Hamilton et al. | 356/400 |
| 3,778,169 | 12/1973 | Adams | 356/399 |
| 3,799,674 | 3/1974 | Guillet et al. | 356/399 |
| 3,902,810 | 9/1975 | Hamar | 356/153 |
| 4,172,665 | 10/1979 | Wakita et al. | 356/153 |

*Primary Examiner*—R. A. Rosenberger
*Attorney, Agent, or Firm*—Becker & Becker, Inc.

[57] ABSTRACT

Apparatus for working of aligned bores, particularly for repairing of crank shaft bearings and their bores of internal combustion engines. In the region of the bore to be worked on there is provided a driven hollow shaft carrying a tool for working the bore or bores, which hollow shaft is adjusted relative to a laser beam which is in alignment with the longitudinal axis of the bores.

8 Claims, 10 Drawing Figures

APPARATUS FOR WORKING ALIGNED BORES

The present invention relates to apparatus for working aligned bores, particularly for repairing of crank shaft bearings and their bores of internal combustion engines.

When such bores are originally produced, they are usually machined, by heavy machine tools, in order to provide the required accuracy thereof. However, when one or several of these bores have to be reworked, during overhaul or repair work, such heavy machine tools cannot be employed. The primary difficulty in working of such bores during various states of assembly resides therein that exact aligning of the drilling equipment relative to the central axis of the desired bore is difficult to attain. It is known to achieve alignment using long drill shafts; however, these are very heavy and adjustment thereof is only possible with considerable loss of time and effort. The weight is, however, of primary importance, since such repair work is carried out at various distant locations, for example, when repairing engines of seagoing vessels, so that a considerable weight of the equipment for carrying out the repair work is tantamount to considerable transporting costs.

It is, accordingly, an object of the present invention to improve the apparatus for working aligned bores in such a way that it is of low weight and that it can be aligned with a relatively low time and operating effort, while, nevertheless, achieving a high operating accuracy.

This object and other objects and advantages of the invention will appear more clearly from the following specification in connection with the accompanying drawings, in which.

The present invention is primarily characterized by a tool-carrying, driven hollow shaft, provided in the region of the bore to be worked on, which hollow shaft is adjusted relative to a laser beam aligned to the central longitudinal axis of the bores. The laser beam, thus, assumes the role of a heavy drill shaft for the aligning. The laser beam is adjusted to the central longitudinal axis of the bores, so that now a short hollow working shaft can be provided at random bore locations, which hollow shaft is precisely adjusted to the laser beam, thus permitting an accurate working or reworking of the bore.

Various indicating elements can be employed corresponding to the optical adjustment of the light beams.

According to one embodiment of the invention, centering discs can be mounted in the bores adjacent the bore to be worked on, which centering discs include indicating elements for aligning the laser beam.

It is advantageous that the means for generating the laser beam be secured to one centering disc. This can then be installed in place of an indicating element, so that for this particular centering disc no indicating element will be required. At the same time, the required adjustment effort is then reduced, so that not only the centering disc and, as well, the means for generating the laser beam need to be aligned.

In accordance with another embodiment, the centering discs include movable measuring devices and adjustable chucking means for adjusting or fixating of the centering discs within pertaining bores, whereby, for example, the movable measuring devices can include a swing arm which is centrally supported relative to the pertaining centering disc and which includes at its free end a measuring or indicating gauge.

In accordance with another embodiment, the hollow shaft includes internally at least one adjusting disc with indicating means for adjusting of the hollow shaft. The indicating means of the adjusting disc for the hollow shaft can be provided by an indicating element used with the centering discs. When an exact aligned positioning of the hollow shaft is possible, one adjusting disc will be sufficient. Usually, however, two adjusting discs are installed in the hollow shaft, whereby full adjustment is attainable, independently of the hollow shaft mounting.

In accordance with another embodiment, the centering discs and the adjusting discs include central bores having a size corresponding to the thickness of the laser beam. When the laser beam light emerges in full from that centering or adjusting disc positioned farthest from the means generating the laser beam, an exact alignment and adjustment is attained. This can be electronically measured by means of a photocell arranged next to the centering or adjusting disc farthest positioned from the laser beam generator, whereby, advantageously, a dispersion lens is provided in front of the photocell.

In accordance with yet another embodiment, the indicating means for centering and adjusting can include glass fiber optical elements. The glass fiber optical elements can include a central opening corresponding to the laser beam thickness, which opening can be provided, for example, by removal of the central glass fiber. At least the glass fiber optical elements of the pertaining adjusting discs for the hollow shaft are angular, whereby the viewing ends of the optical elements, on installation in the hollow shaft, extend either internally or externally of the walls of the hollow shaft. The centering discs and/or adjusting discs can include a half transparent (halb durchlässig) mirror mounted in a prism, which cooperates with a glass fiber optical element, whereby the reflecting layer of the mirror has a central opening of a size approximately corresponding to the thickness of the laser beam.

The aforementioned glass fiber optical elements are very rugged and can be quickly and simply read or monitored. Fibers disposed annularly about a central fiber can have different coloring, which enhances reading of the instrument. When no light is visible at the viewing surface, when using a glass fiber optical element having a central opening, an exact alignment or adjustment has been attained.

When attaining a precise centering or adjustment, using the aforementioned mirror, the laser beam passes through the opening in the mirror and the beam is not reflected. When the laser beam is not directed towards the opening of the mirror, it will be deflected on the surface mirror and an indication is obtained at the glass fiber optical element in the form of a straight or linear optical element, and not as aforementioned in the form of an angular optical element. This embodiment, furthermore, provides the advantage that only one of such a device is required in the hollow shaft, since the forward and rearward prism surfaces also indicate angular misalignments of the hollow shaft. Because, when the first prism surface, in the direction of the laser beam, is not at an angle to the beam, a refraction of the beam occurs, whereby the refracted beam may pass through the opening of the mirror, and the laser beam is redirected at the rearward prism surface. This means, however, that the laser beam leaves the prism axially offset, and this error can be observed on the indicating element of the centering or adjusting disc farthest removed.

At least one of the centering discs, preferably the centering disc next to the hollow shaft, in the direction of the laser beam, can include a glass disc having an opening in conformity with the thickness of the laser beam, which glass disc, beginning from the opening, increases radially outwardly in thickness and/or is colored increasingly continuously or annularly increasingly from the innermost center radially outwardly.

Thus, instead of the dispersion lens, the centering or adjusting disc farthest removed from the means generating the laser beam can include a centrally arranged glass disc having an opening corresponding to the thickness of the laser beam. The glass disc can include radially, outwardly directed dark colored rings or is colored dark, continuously from the innermost center radially outwardly. The same effect can be achieved by a disc of a constant colored, for example, gray colored, translucent (or transparent) glass, or by synthetic or plastic material, when the thickness of the disc increases from the center radially outwardly. When the laser beam is passed, on centering or adjusting, from the outside towards the center, an increasing brightness indication is obtained which increases rapidly in magnitude as the beam reaches the central opening. The same effect permits adjustment of the hollow shaft on the laser beam.

In accordance with another embodiment, the adjusting device for the hollow shaft includes a cylindrical prism (Prismenwalze) with a reflecting outer cylinder surface or mantle surface, the prism being mounted in the hollow shaft. Forwardly thereof there is provided a conically aligned device for provision of auxiliary or supplemental laser beams, preferably an optical lens, whereby the auxiliary laser beams can be directed onto the reflecting cylinder surface.

For example, when the hollow shaft and, thereby, the prism cylinder are accurately adjusted, the auxiliary laser beams are coincidental, on the side opposite of the laser beam generating device, in a certain point, and this condition is indicated either by increased brightness or by a dark spot, depending on the shaft misalignment, or polarization. However, when the prism cylinder extends in a position offset to the axis, or in an inclined position relative to the laser beam, the auxiliary laser beams are incidental at different locations and at different angles on the outer cylinder surface, in a way such that reflected auxiliary laser beams do not coincide with the primary laser beam and, accordingly, fail to impart either bright or dark spots or patterns to the laser beam.

In accordance with one embodiment, the adjusting and/or indicating elements can be in the form of prisms having reflecting outer or mantle surfaces and wherein the pertaining end faces are either conical or pyramid-shaped. The angle of the cone or of the pyramid is selected in a way so that the laser beam leaving the prism is focused in a bundle, whereby the control of the laser beam and, thereby, examination required for alignment or adjustment is carried out by means of a suitable device, preferably by means of a measuring microscope. The angle of the cone or the pyramid can also be selected such that the laser beam leaving the prism is conically spread in a pattern, with the required control of alignment or adjustment of the laser beam being preferably provided by means of a luminous or luminescent screen or target screen. The apex of the cone or of the pyramid at the laser inlet end face can be planar with a refraction plane being provided which extends perpendicular to the central axis of the prism and is equal to or less than the cross section of the laser beam. The apex of the cone or the pyramid at the laser exit end face of the prism is shaped either conically or pyramid-shaped, whereby the base of the pertaining shape is in conformity with the size of the refraction plane, and whereby the pertaining cone or the pertaining pyramid is obtuse to such an extent that laser beams entering parallel to the prism central axis, leave the cone, or the pyramid, and the pertaining cone and pertaining pyramid coincide in a spatially readily accessible viewing plane.

The differing angular dimensions of the cones or pyramids do not principally change the path of the beam within the prism and, accordingly, do not change the actual alignment; however, they greatly influence the type of viewing, since, in the one case, the laser beam is focused, while, in the other case, the laser beam is diffracted or dispersed. The dispersed laser beam can be viewed on a viewing mirror, and the focus beam is preferably viewed by means of a measuring microscope.

When the indicating elements include prisms, the apparatus is simply and economically produced, of simple construction, well suited for transportation, and insensitive to shocks. It is particularly well suited for centering of the laser beam in bores of crank shaft bearings and for adjusting of the hollow shaft relative to the laser beam, whereby, since also angular misalignments are readily discernible, only one prism needs to be installed in the hollow shaft.

With the embodiments of the invention it will be particularly advantageously feasible to determine a dislocation, for example, an offset of the central axis of the hollow shaft relative to the laser beam and an angular dislocation thereof. For example, when the laser beam is passed coaxially and centered onto the conical end face of the prism, the beam is conically spread, reflected on the outer surface, and is directed onto that region of the cone apex at the exit surface. There it is refracted in conformity with the angle, and is then emitted, either centrally bundled or spread out, so that a full beam is visible. When the laser beam enters axially offset, but parallel to the axis, on the opposite half of the entrance end face, opposite relative to the direction of offset of the axis, a larger cross sectional area of the laser beam is refracted than on the other side, whereby the reflected beams, inciding on the outlet cone of the smaller area, do not fully brighten this cone portion, so that a generally sickle-formed dark spot is visible within the emitted laser beam and a simple adjustment can be carried out. A similar exit pattern of the laser beam is obtained when the incidence of the beam is axially but not parallel to the central axis of the prism. The laser beam cone then reflects on different locations of the prism surface, whereby the reflected beam annulus or ring inciding on the exit cone, again, does not fill these, and dark spots can be determined.

With the apex of either the cone or the pyramid at the end face of the laser beam inlet, as aforesaid, angular and axial deviations of the laser beam, or of the hollow shaft, are particularly well ascertained and corrected. For example, when the laser beam enters the prism, coaxially to the longitudinal central axis thereof, it is not deflected on the perpendicular deflection plane, but passes through the prism, and is conically spread in a pattern by the particular shape at the exit end of the prism. The laser beam portion inciding outside of the deflection plane onto the frusto conical portion, or the truncated pyramid, is reflected by the prism surface and refracted by the pertaining shape at the exit end, however, at a different angle, so that the cone annuli coincide on a viewing plane, to produce a ring of uniform light density, according to the pertaining polarization. When the laser beam enters the prism axially offset or angularly relative to the central axis, in this viewing ring, light or dark sickle-shaped areas are produced or, according to polarization, dark and bright spots, or dark and light radial lines.

In accordance with another embodiment of the invention, there protective shielding means are provided between the centering discs and the hollow shaft, which are in sealing contact with the hollow shaft. One of the shielding means, which can include a protective tubing, is furnished with an air connection and, at least during operation, the hollow shaft and the protective shielding means are internally subjected to a low overpressure.

Since the accuracy of the laser beam can be affected by dust and turbulence of air, it is proposed that protective shielding is provided between the centering discs and the hollow shaft. Such protective shielding can be provided by hollow tubes or the like means, which sealingly contact at least the hollow shaft. These shielding means protect the laser beam against undesirable external influences. A low overpressure ensures that dust or similar foreign matter does not enter into the interior of the hollow shaft and the associated protective shieldings.

In order to eliminate errors due to possible scattering of the laser beam in small bores, the apertured partition or diaphragm and the indicating means can be swingable, so that, upon completion of the adjusting or centering operation they can be moved out of the plane of the laser beam. Enlargement or widening of the opening diaphragm or aperture-like, upon completion of the measuring operation, results in the same effect.

Figure 1:
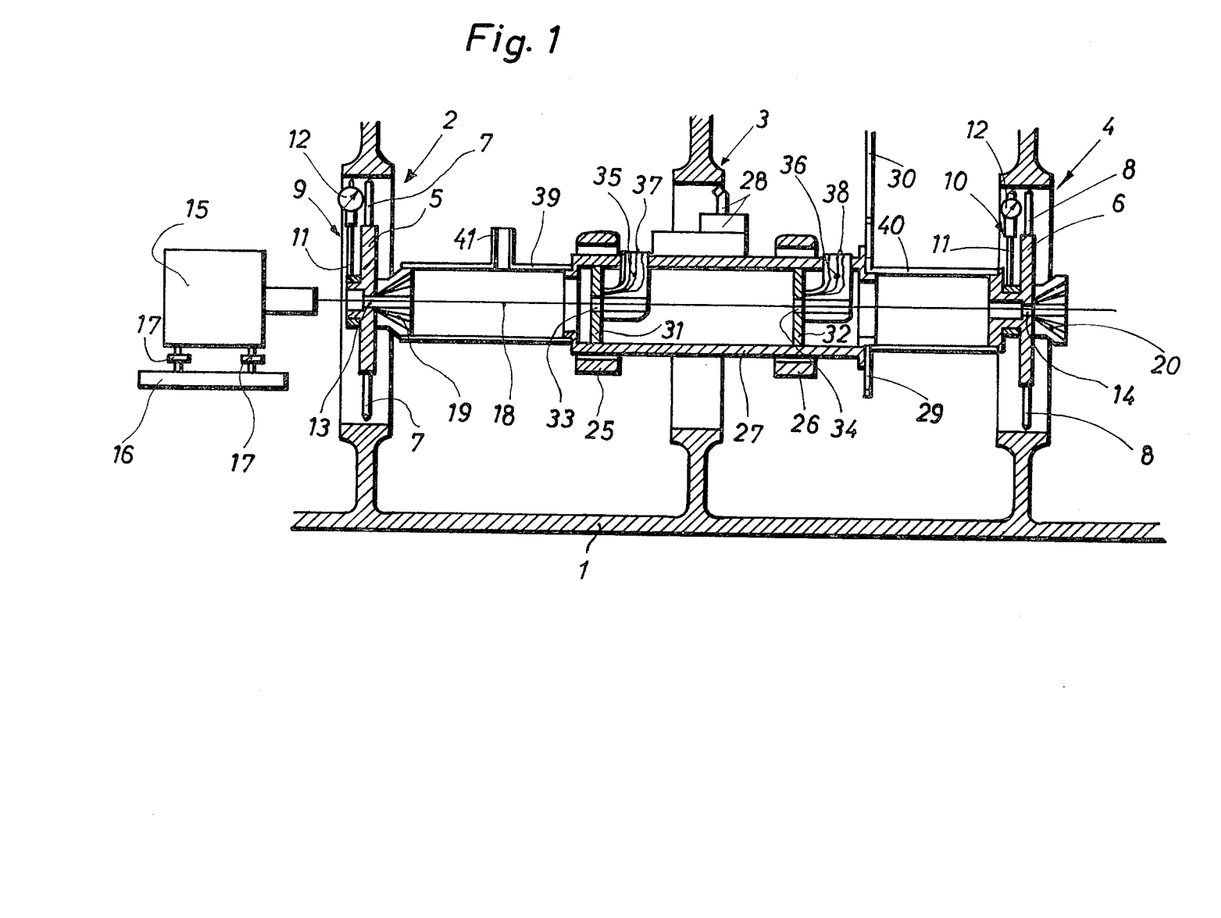
FIG. 1 is a diagrammatical side elevational view, in section, of an apparatus in accordance with one embodiment of the invention in which the centering and adjusting discs carry glass fiber optical elements.
Figure 2:
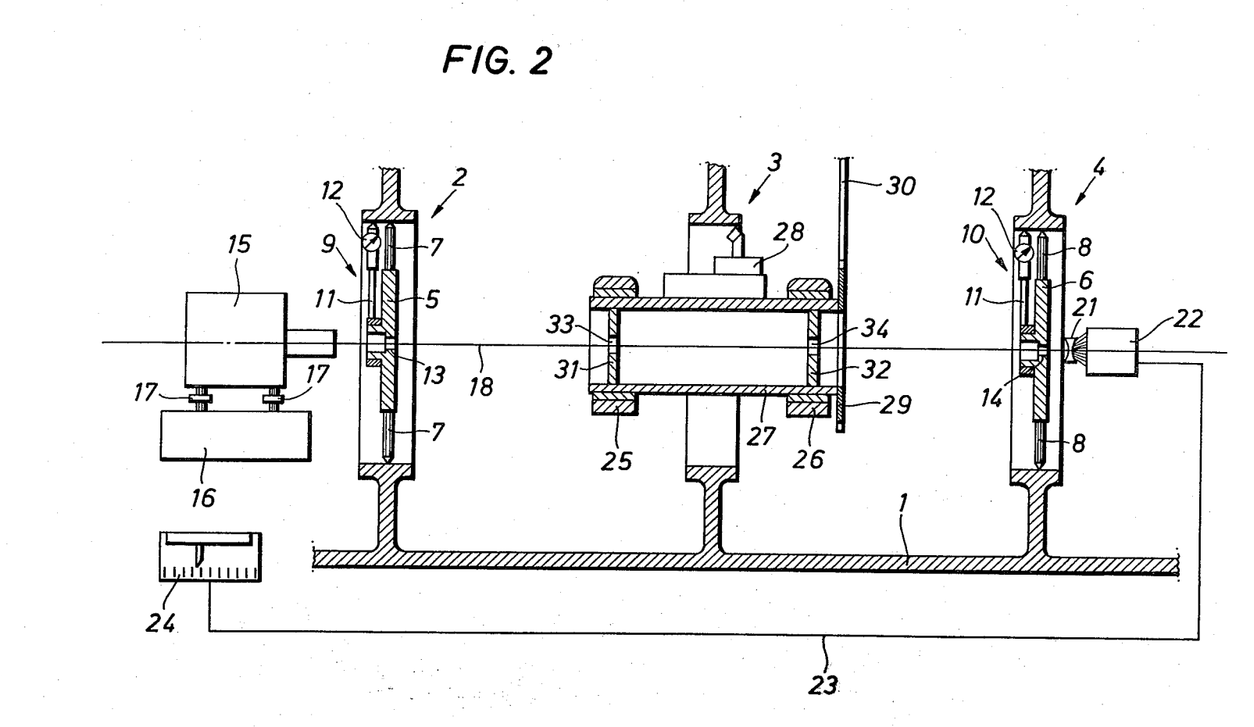
FIG. 2 is a view corresponding to FIG. 1, wherein, however, the centering and adjusting discs include central bores and wherein a photocell is provided at the end opposite the location of the laser beam generating means or emitter.

Referring now particularly to the drawings, in FIGS. 1 and 2 the like reference numerals are selected for like elements. The numeral 1 designates housing, crank chamber, or crankcase, shown only in part, which comprises bearing bores 2, 3, and 4. For the example at hand, it is assumed that only the bearing bore 3 is to be worked, for example, due to a necessary repair; while the bearing bores 2 and 4 have positively aligned inner surfaces and need not be worked. Thus, centering discs 5 and 6 are positioned in the bearing bores 2 and 4 and secured by clamps 7 and 8. Clamps 7 and 8 are adjustably associated with the centering discs 5 and 6. Each of the centering discs 5 and 6 is further associated with measuring devices 9 and 10, respectively, which are centrally mounted and swingable through 360°. Each of the measuring devices includes a pivot arm 11 and a measuring gauge or dial gauge 12. At the center of the centering discs 5 and 6, respectively, central openings or apertures 13 and 14, respectively, are provided which, in association with the measuring devices 9 and 10, can be aligned so that the respective centers coincide with the longitudinal central axis of bores 2 and 4. Ahead of bore 2 there is provided a laser beam generating device or emitter, designated by numeral 15, which is vertically adjustable on base 16 by means of adjustment screws 17. The base 16, not shown in detail, can be mounted on a solid support or on the crank case or crank chamber 1. The laser beam emitter 15 provides a laser beam, generally indicated by a straight line, designated by the numeral 18, which extends through the bores 2, 3 of housing 1 and at least through the bore 4. According to the embodiment indicated in FIG. 1, the centering discs 5 and 6 are provided on the sides opposite to the laser beam emitter 15, with glass fiber optical elements 19 and 20. The laser beam emitter 15 can be adjusted by means of the optical elements 19 and 20 in a way such that the laser beam 18 conicides with the longitudinal axis of the bores 2, 3 and 4.

In the embodiment according to FIG. 2, a dispersion or scattering lens 21 and a photocell 22, both centrally mounted, are provided, on the side of centering disc 6 which is facing away from the laser beam emitter 15 of centering disc 6. The photocell 22 is connected via an electrical conduit means 23, to an indicator device 24. When the maximal light intensity of the photocell 22 is reached, which condition will be indicated by the indicator device 24, in accordance with the embodiment of FIG. 2, the laser beam 18 coincides with the longitudinal central axis of bores 2, 3, and 4. For this, it is assumed that the cross-sectional dimension of the bores 13 and 14 is approximately of the same size as the cross-sectional dimension of the laser beam 18. In order to avoid scattering effects, the bore diameter can be enlarged after adjustment or setup, by means of an aperture (stop) or diaphragm, not shown.

Figure 6:
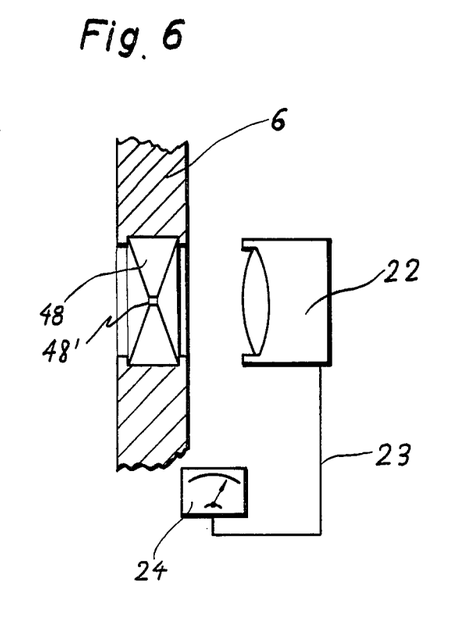
FIG. 6 is a diagrammatic representation of a photocell and a glass disc which increases in thickness radially outwardly from its opening.

A modification of a dispersion or scattering lens is diagrammatically shown in FIG. 6. Since the photocell 22, the electrical conduit means 23, and the indicator device 24 are provided in the same manner, they are identified by the same reference numerals. A glass disc 48 having a central opening 48' with a cross-sectional dimension corresponding approximately to the cross-sectional dimension of laser beam 18 is installed in centering disc 6. The glass disc 48 is generally biconcave, the pertaining cavities, however, being preferably conically planar towards the central vertical plane of the disc. The disc 48 is radially outwardly colored from opening 48', preferably grey. This provides a positive brightness contrast at photocell 22 when the laser beam 18 reaches the opening 48', passes therethrough, or moves along glass disc 48.

Referring again to FIGS. 1 and 2, in the region of bearing bore 3 there are provided two mounting or bearing blocks 25 and 26. The bearing blocks 25 and 26 are mounted on the crank case 1, not shown in detail, or can be mounted on the base of the engine. A hollow shaft 27 is mounted in the bearing blocks 25 and 26, and a tool 28 is mounted on the hollow shaft 27 so as to be axially movable along the hollow shaft 27. Tool 28 works or machines the bearing bore 3 on rotation of the hollow shaft 27. Near the bearing block 26 there is provided a sprocket gear 29 which cooperates with a drive chain 30, driven with the sprocket wheel of a drive means, both not shown. Two adjusting discs 31 and 32 are disposed in the hollow shaft 22. These discs are provided with bores 33 and 34, respectively, at the centers thereof. Bores 33 and 34 correspond to the bores 13 and 14 of the centering discs 5 and 6 and are also in conformity with the thickness of the laser beam 18. For alignment, the bearing blocks 25 and 26 are adjusted until the laser beam 18 passes straight through the bores 33 and 34. When this condition is attained, the hollow shaft 27 is adjusted relative to the central longitudinal axis of bearing bores 2, 3, and 4. In the embodiment according to FIG. 1, angular or bent glass fiber optical elements 35 and 36 are opposite to the laser beam emitter 15 provided on the pertaining sides of adjustment discs 31 and 32, with the viewing surfaces 37 and 38 extending through the wall of hollow shaft 27. Thus, in a simple manner it will be possible to determine the direction of a misalignment of the hollow shaft 27, and a quick adjustment can be carried out. As is also indicated in FIG. 1, between the hollow shaft 27 and the centering discs 5 and 6 there is provided a protective shielding in the form of tubes 39 and 40. These tubes can rotate with the driven hollow shaft 27, and sealingly engage the centering discs and the hollow shaft. Protective tube 39 includes an air connection 41 through which filtered or purified air can be admitted into the tube from a source not shown, so that the hollow interior of the tubes and the shaft is subject to a lower overpressure.

Figure 3:
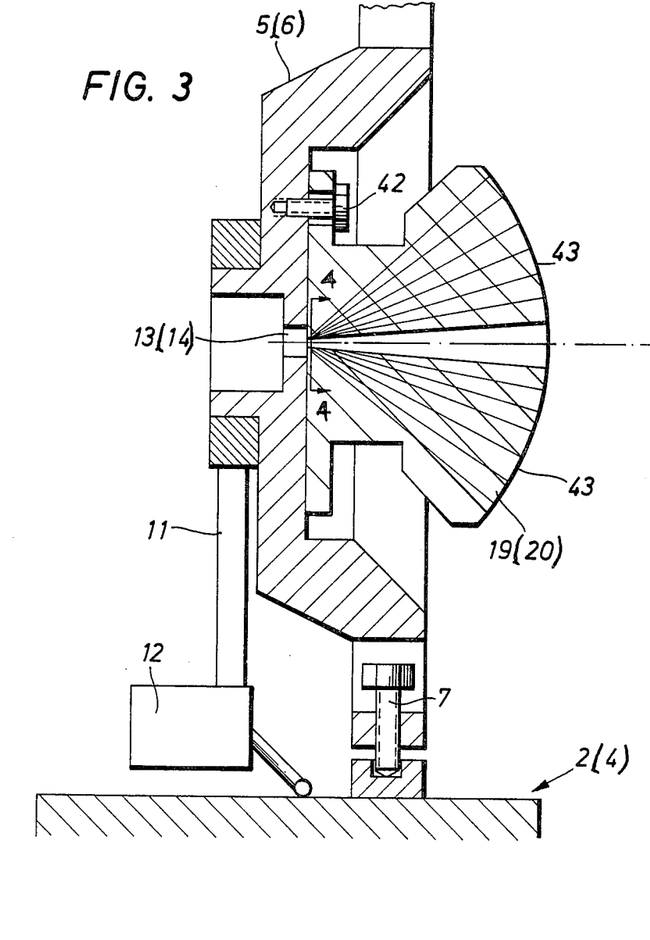
FIG. 3 is a side elevational, sectional view of a centering disc with a glass fiber optical element and showing the measuring device and a chucking equipment.
Figure 4:
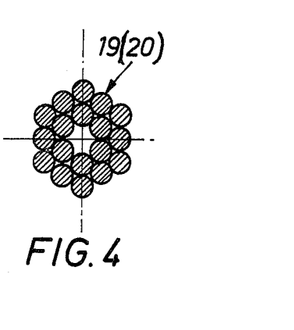
FIG. 4 is a section along line IV—IV of the glass fiber optical element shown in FIG. 3.

As is indicated in FIGS. 3 and 4, the glass fiber optical elements designated by numerals 19 and 20 are secured to the centering discs 5 and 6 by means of screws 42. When using glass fiber optical elements, the central bores 13 and 14 will have a larger diameter. The actual centering bore is provided by the glass fiber optical elements in a manner whereby the central glass fiber is eliminated, as is shown in greater detail in FIG. 4. When the laser beam 18 is properly aligned, no pattern or image will appear on the viewing surface of the glass fiber optical element, designated by numeral 43, since the laser beam passes directly through the central opening of the element. The individual glass fibers can be provided annularly about the center and can be provided with varying colorations for enhanced and accelerated alignment. Excepting the angular or bent formation of the elements shown in FIG. 3, the angular glass fiber optical elements 35 and 36, provided at the adjustment discs 33 and 34 are similar, and can, therefore, also be installed in the centering discs 5 and 6.

Figure 5:
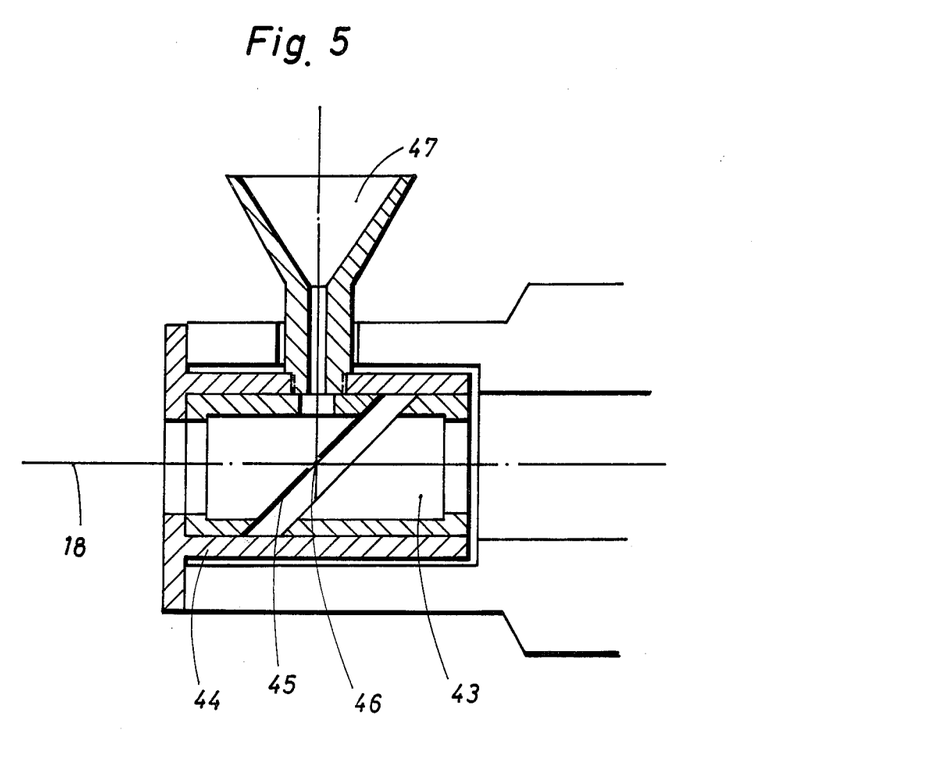
FIG. 5 is a sectional view of an indicating element with a deflecting mirror and a glass fiber optical element.

Referring now to FIG. 5, a prism 43 is secured in a holder 44, which holder 44 can be installed in the adjustment discs 31, 32, the centering discs 5, 6, or the hollow shaft 27. A semi-translucent (halb durchlässig) deflection mirror 45 is provided within the prism 43 with the reflection layer at the center of the mirror 45 being provided with an opening 46. Centering or adjustment is attained when the laser beam 18 passes, in a straight line, through the opening 46. A glass fiber optical element 47 is provided in the surface of the holder 44 which can correspond to the glass fiber optical elements designated by numerals 19 and 20 (FIG. 1). When the laser beam 18 does not pass through the opening 46, it is refracted by mirror 45 and then passed to the glass fiber optical element 47. The embodiment in accordance with FIG. 5 provides the advantage that one adjusting disc will be sufficient for the hollow shaft since the prism provides the function of the other adjusting disc. When the laser beam is not orthogonally directed towards the prism 43, it will leave the prism axially offset, which condition can be determined by the indicator means employed at the next or last centering disc.

Figure 7:
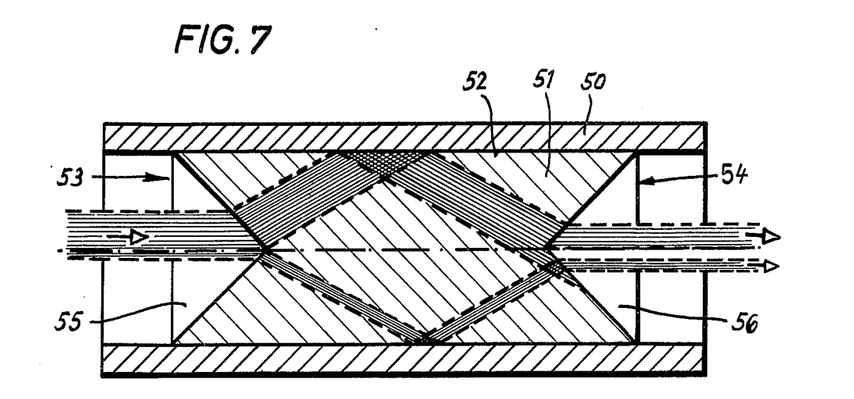
FIG. 7 is a cross-sectional side elevational view of a prism having a cylindrical mantle surface and conical depressions in the end faces thereof, with the angles of the cones selected in a way so that the laser beam is focused in a bundle.
Figure 8:
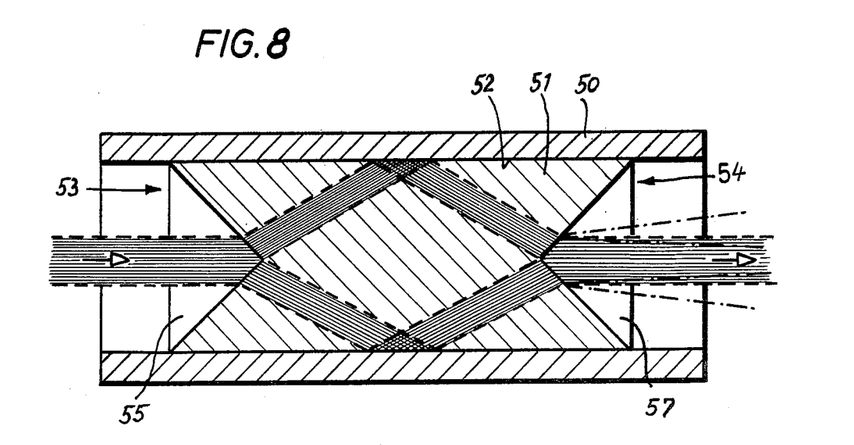
FIG. 8 is a longitudinal cross-sectional view of a prism according to FIG. 1, wherein the cone angle is selected in a way so that the emerging laser beam is dispersed in a pattern.

As generally indicated in FIGS. 7–10, a bushing designated by numeral 50, can be mounted in the centering disc 5 and 6, or the adjusting discs 31, 32, in the case of the adjusting disc, one bushing only being provided for both discs. A prism, generally designated by numeral 51, is securely mounted in the bushing 50. Prism 51 has a cylindrical mantle or outer surface, and pertaining end faces 53 and 54. Prisms, such as prism 51 can be provided in adjustment discs 31, 32, and centering discs 5,6 so that the laser beam 18 is directed towards the pertaining end face 53, to enter the prism, and leaves the prism at the pertaining end face 54. The entry faces 53 of the prisms 51, according to FIGS. 7 and 8, are formed with a conical, concave or hollow cone depression 55, the apex of which coincides with the longitudinal axis of the system. In both embodiments, the hollow cone 55 is formed with an angle so that a laser beam refracted on the angular face of the hollow cone incides onto the reflecting surface 52 of the prism 51. The end faces 54 of prisms 51 in FIGS. 7 and 8 are also provided with concave depressions or hollow cones 56 and 57, whereby the angle of the cone 56 is selected so that an emitted laser beam is focused in a bundle, while the angle of the cone 57 is selected so that the laser beam is spread in a pattern. The spreading of the laser beam causes a reduction of its intensity, so that the laser beam leaving the system can be viewed on a luminescent or luminous, or target screen, not shown, while the laser beam focused in a bundle, as is indicated in FIG. 7, is passed to a measuring microscope, not shown.

Figure 9:
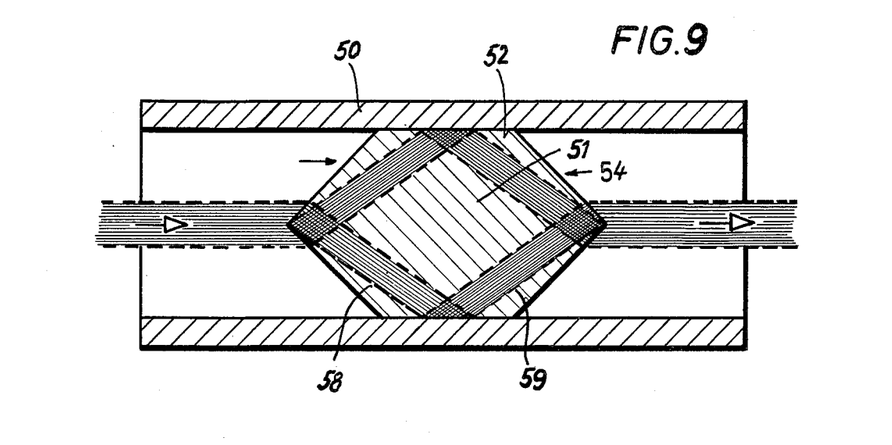
FIG. 9 shows a longitudinal cross-sectional view of a prism having projecting cones at the end faces and wherein the emerging laser beam is focused in a bundle.

The end faces 53 and 54 of a prism 51 according to FIG. 9 include conical projections or solid cones 58 and 59. The angle of the cone 58 is selected so that the laser beam, leaving the system according to FIG. 7, is focused in a bundle. A principle change of the beam pass does not occur, excepting that the laser beam rays cross each other within the prism 51. The laser beam, according to FIGS. 8 and 9, is passed coaxially to the central axis of the prism into the system with the result that, in the one case, a coaxially spread exit beam leaves the system and, in the other case, a focused or bundled beam leaves the system. When the laser beam is directed parallel to the axis, but offset to the axis to the prism, as indicated in FIG. 7, the upper surface of the hollow cone 55 receives a greater part of the cross sectional area of the laser beam than the lower part. However, since the rays emitted from the hollow cone apex form the outer ring of the emerging laser beam ray, a laser ray with a round cross section is obtained at the exit end of the system. A certain proportion of the part of the upper laser beam portion, reflected at the mantle surface 52, reaches also the lower part of the holow exit cone 56 and is there dispersed, whereby the balance of the laser beam—as would be the case in central incidinig—forms the other half or portion of the ray leaving the system. The lower half of the hollow cone 55 on which the laser beam incides is not sufficient to fill the the lower half of the hollow exit cone 56, so that the laser beam of round cross sectional area leaving the system is provided with a dark, sickle-shaped image. When this sickle-shaped image is passed to the measuring microscope or to the target screen, the centering or the adjusting discs are moved in the direction opposite to the sickle, until a full laser beam is obtained. A similar change of the laser beam leaving the system occurs when the prism is not displaced parallel, but when the central axis and the laser beam are angularly positioned relative to each other.

Figure 10:
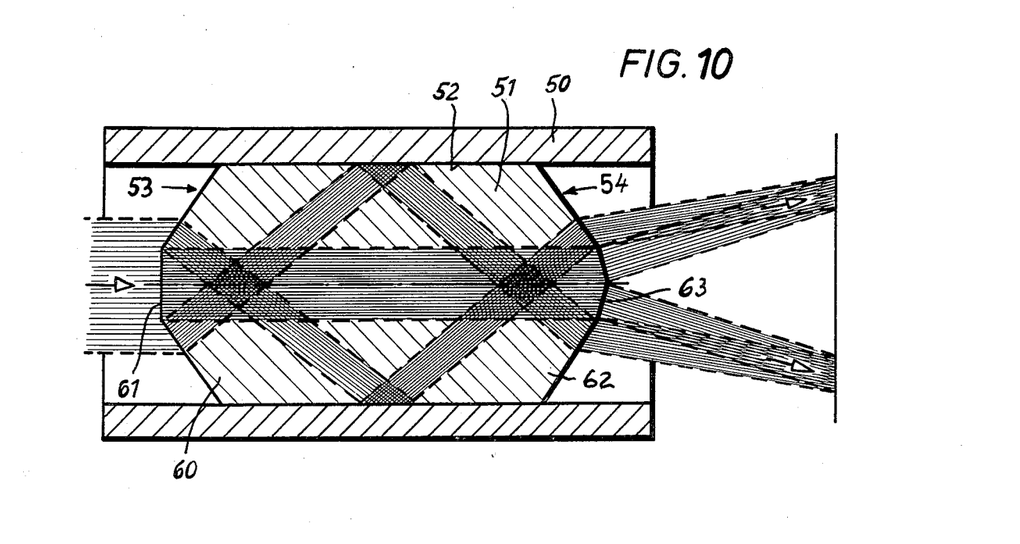
FIG. 10 is a longitudinal cross-sectional view of a prism having a cylindrical outer surface, a central vertical face at the laser inlet end face and a central, pointed cone at the laser beam exit end face.

The end face 53 of the prism 51, according to FIG. 10, comprises a cone 60 the apex of which is flattened so that a circular refraction plane 61 is provided, extending perpendicular to the longitudinal axis of the prism 51. The end face 54 of the prism 51 is conically shaped and provided with a pointed cone 63. The base area of the cone 63 corresponds to the surface area of the refraction plane 61. The apex angle of the pointed cone 63 is an obtuse angle so that the rays passing through the surface thereof are refracted at a different angle than the rays passing through the outer surface of the cone 62. As is indicated in FIG. 10, at coaxial entry of the laser beam into the prism, the conically spread rays incide on a viewing plane and form a common viewing pattern in the form of a ring. When the ray enters the prism coaxially, this observation ring is without interruptions and of uniform light intensity, the viewing ring extending perpendicularly to the central prism axis. When the laser beam is, however, directed angularly or offset to the axis of the prism, sickle-shaped images of a different light intensity are produced within the viewing ring, or, according to the polarization of the coinciding laser beams, bright or dark areas, or bright or dark radial stripes are produced. The prism, or the centering or adjusting discs, are then moved or separated until a ring of uniform light intensity is obtained.

The present invention is, of course, in no way restricted to the specific disclosure of the drawings, but also encompasses any modifications within the scope of the appended claims.

What we claim is:

1. An apparatus for working with a tool at least one of a plurality of bores aligned on an axis wherein the bores are associated with the crankshaft bearings of internal combustion engines, said apparatus comprising in combination:
    means for generating a laser beam to be passed through said bores and for aligning the laser beam with a longitudinal axis aligning said bores;
    a driven hollow shaft for supporting said tool in one of said bores, said hollow shaft being positioned within said bore and surrounding the longitudinal axis thereof and said hollow shaft being adjustable with respect to said laser beam to align with the laser beam and said longitudinal axis;
    centering discs positioned in those bores not being worked on by said tool, said centering discs including means for indicating misalignment between said discs and said laser beam, said centering discs further including movable measuring devices and chucking means for adjusting and subsequently fixing, respectively, said centering discs within said bores wherein the centering discs are centered with respect to the bores;
    a cylindrical prism centrally mounted mounted within said hollow shaft for alignment with the laser beam, the prism having a cylindrical reflecting mantle surface and conical end surfaces having aligned axes which are aligned with the laser beam for initially splitting the laser beam into components which components reflect from said reflecting mantle surface and converge back to a single beam when the aligned axes are aligned with the laser beam and converge back into a plurality of beams when the aligned axes are out of alignment with the laser beam, whereby misalignment can be detected.

2. An apparatus for working with a tool with at least one of a plurality of bores aligned on an axis wherein the bores are associated with crankshaft bearings of an internal combustion engine, said apparatus comprising in combination:
    means for generating a laser beam to be passed through said bores and for aligning the laser beam with the longitudinal axis aligning said bores;
    a driven hollow shaft for supporting said tool in one of said bores, said hollow shaft being positioned in said bore and surrounding the longitudinal axis thereof, an annular disc fixed within said hollow shaft and said hollow shaft being adjustable with respect to said laser beam to align the axis of said annular disc with the laser beam;
    centering discs positioned in those bores not being worked on by said tool, said centering discs including means for indicating misalignment between said discs and said laser beam, said centering discs further including movable measuring devices and chucking means for adjusting and subsequently fixing, respectively, said centering discs within the bores associated therewith whereby the centering discs are centered with respect to the bores;
    prism means mounted in at least one of said discs for monitoring adjustment of said hollow shaft, said prism means having reflecting mantle surface means and aligned refracting end surfaces for initially splitting the laser beam into components and thereafter converging the components into at least one discrete beam, which discrete beam is indicative of alignment of the hollow member with the longitudinal axis.

3. An apparatus according to claim 2 wherein the refracting end surfaces are conically projecting surfaces.

4. The apparatus of claim 2 wherein the end surfaces are conically recessed surfaces.

5. The apparatus of claim 2 wherein the end surfaces are projecting, truncated cones.

6. An apparatus for working with a tool with at least one of a plurality of bores aligned on an axis wherein the bores are associated with crankshaft bearings of an internal combustion engine, said apparatus comprising in combination:

means for generating a laser beam to be passed through said bores and for aligning the laser beam with the longitudinal axis aligning said bores;

a driven hollow shaft for supporting said tool in one of said bores, said hollow shaft being positioned in said bore and surrounding the longitudinal axis thereof, an annular disc fixed within said hollow shaft and said hollow shaft being adjustable with respect to said laser beam to align the axis of said annular disc with the laser beam;

centering discs positioned in those bores not being worked on by said tool, said centering discs including means for indicating misalignment between said discs and said laser beam, said centering discs further including movable measuring devices and chucking means for adjusting and subsequently fixing, respectively, said centering discs within the bores associated therewith whereby the centering discs are centered with respect to the bores;

a prism mounted in the last disc of the apparatus wherein the prism includes a cylindrical reflecting mantle parallel with said longitudinal axis and a first refracting end surface in the form of a projecting truncated cone aligned with said longitudinal axis, the truncated cone having a planar surface extending at right angles to the longitudinal axis, and said prism having a second refracting end surface which is a projecting cone having two intersecting conical surfaces wherein the conical surface adjacent the axis is more obtuse than the conical surface which intersects the cylindrical mantle and wherein the conical surface adjacent the axis has a projected base which corresponds in shape and area to the flat surface of the opposing refracted end face whereby the laser beam is refracted upon exit from the prism to form a circular pattern, and monitoring means aligned with the said longitudinal axis for monitoring said pattern and indicating when said pattern is unsymmetrical which is indicative of misalignment of the hollow shaft member with the longitudinal axis.

7. The apparatus in accordance with claim 1, 2, 3, 4, 5 or 6 further comprising:

shielding means extending between said discs and surrounding said discs for shielding said laser beam.

8. The apparatus of claim 1, 2, 3, 4, 5, or 6 further including shielding means extending between said discs and being in sealing contact with said discs.

* * * * *